(12) United States Patent
Ueda et al.

(10) Patent No.: US 8,225,088 B2
(45) Date of Patent: Jul. 17, 2012

(54) INFORMATION PROCESSING APPARATUS, DISC, INFORMATION PROCESSING METHOD, AND PROGRAM

(75) Inventors: Kenjiro Ueda, Kanagawa (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 455 days.

(21) Appl. No.: 12/328,125

(22) Filed: Dec. 4, 2008

(65) Prior Publication Data

US 2009/0183262 A1 Jul. 16, 2009

(30) Foreign Application Priority Data

Jan. 16, 2008 (JP) ................................. 2008-006607

(51) Int. Cl.
*H04L 29/06* (2006.01)
(52) U.S. Cl. ........ 713/158; 713/156; 713/168; 713/175; 713/176; 713/178; 380/201
(58) Field of Classification Search .................. 713/156, 713/158, 168, 175–178; 380/201
See application file for complete search history.

(56) References Cited

U.S. PATENT DOCUMENTS

| 7,269,564 B1 | 9/2007 | Milsted et al. | |
|---|---|---|---|
| 2002/0013772 A1 | 1/2002 | Peinado | |
| 2004/0205345 A1 | 10/2004 | Ripley et al. | |
| 2004/0215959 A1 * | 10/2004 | Cook et al. | 713/156 |
| 2006/0200661 A1 * | 9/2006 | Doonan et al. | 713/156 |
| 2007/0220259 A1 * | 9/2007 | Pavlicic | 713/176 |
| 2007/0234046 A1 * | 10/2007 | Ishiyama | 713/158 |
| 2008/0069353 A1 * | 3/2008 | Lotspiech | 380/201 |
| 2011/0026710 A1 * | 2/2011 | Lotspiech | 380/255 |

FOREIGN PATENT DOCUMENTS

JP 2005-228432 8/2005

OTHER PUBLICATIONS

U.S. Appl. No. 12/747,100, filed Jun. 9, 2010, Ueda, et al.
"Information technology—Open Systems Interconnection—The Directory: Authentication framework", X.509 (Aug. 1997), International Telecommunication Union, XP017403953, Aug. 1, 1997, 80 pages.

* cited by examiner

*Primary Examiner* — Nabil El Hady
(74) *Attorney, Agent, or Firm* — Oblon, Spivak, McClelland, Maier & Neustadt, L.L.P.

(57) ABSTRACT

An information processing apparatus for controlling use of a content recorded on a disc. The information processing apparatus includes: in reference to a certificate revocation list including invalidation information of a content owner providing the content, a data verification section verifying whether content-owner identification recorded in a content-owner certificate recorded on the disc as a certificate corresponding to the content owner is included in the certificate revocation list, and if included, the data verification section comparing a content-certificate time stamp which is stored in the content certificate recorded on the disc as a certificate corresponding to the content and a CRL time stamp which is invalidation date-and-time information corresponding to the content owner stored in the certificate revocation list; and a content-use control section prohibiting or restricting use of the content if the content-certificate time stamp has date-and-time data not earlier than the CRL time stamp.

12 Claims, 9 Drawing Sheets

INFORMATION PROCESSING APPARATUS, DISC, INFORMATION PROCESSING METHOD, AND PROGRAM

CROSS REFERENCES TO RELATED APPLICATIONS

The present invention contains subject matter related to Japanese Patent Application JP 2008-006607 filed in the Japanese Patent Office on Jan. 16, 2008, the entire contents of which are incorporated herein by reference.

BACKGROUND OF THE INVENTION

1. Field of the Invention

The present invention relates to an information processing apparatus, a disc, an information processing method, and a program. More particularly, the present invention relates to an information processing apparatus, a disc, an information processing method, and a program which control use of contents recorded on an information recording medium.

In particular, the present invention relates to an information processing apparatus, a disc, an information processing method, and a program which control use of contents, recorded on a disc, obtained through the use of EST (Electric Sell Through), which is content providing processing by downloading, and MoD (Manufacturing on Demand), which is content providing processing using a shared terminal, or the like.

2. Description of the Related Art

Discs, such as a DVD (Digital Versatile Disc), a Blu-ray Disc (registered trademark), etc., are used as recording media of contents. For example, a video content, etc., is recorded on a disc (for example, a ROM disc) in order to be provided to a user.

Further, various ways of obtaining and using contents have become widespread. For example, contents are provided to users not only in the form of having been recorded on a ROM disc in advance. The users are provided with download and record processing of contents from content servers to discs, such as recordable discs of an R type, an RE type, etc., possessed by the users. Also, the users are provided with services of recording contents using terminals installed at stores and public areas.

Many of the contents provided to these users are the contents whose copyright, distribution right, etc., are possessed by a creator or a vendor of the contents. Such contents are subjected to use control in order to prevent unauthorized copy (replication), and the like.

There are various forms of use control. For example, in the specification of AACS (Advanced Access Content System), which specifies copyright protection techniques, a content to be recorded on a disc is encrypted, and an available encryption key is provided to the user or a device of the user only when the user has a license, namely the use rights of the content, and the encrypted content is decrypted by applying the encryption key. In this regard, when a content recorded on a disc is used, ID information specific to the disc, such as medium ID, etc., is read from the disc, the read ID is checked, and key generation, etc., is carried out using the ID information. Thus, it becomes possible to strictly control use of the content.

In the case of providing a user with a content stored on a ROM disc in advance, it is relatively easy to prevent illegal distribution of the content by strictly managing pre-determined disc manufacturers who perform recording processing of the content on a disc. However, in the case of downloading the content from a server, and in the case of obtaining and using the content using a terminal installed at a store and a public area, it becomes difficult to manage content providers. Because, it is expected that many content providers supply a large number of contents.

SUMMARY OF THE INVENTION

The present invention has been made in view of the above-described problems, for example. It is desirable to provide an information processing apparatus, a disc, an information processing method, and a program which control use of a content obtained through the use of EST (Electric Sell Through), which is content providing processing by downloading, and MoD (Manufacturing on Demand), which is content providing processing using a shared terminal, or the like.

According to an embodiment of the present invention, there is provided an information processing apparatus for controlling use of a content recorded on a disc, including: in reference to a certificate revocation list (CRL) including invalidation information of a content owner providing the content, a data verification section verifying whether content-owner identification recorded in a content-owner certificate recorded on the disc as a certificate corresponding to the content owner is included in the certificate revocation list (CRL), and if the content-owner identification is included in the list, the data verification section comparing a content-certificate time stamp which is stored in the content certificate recorded on the disc as a certificate corresponding to the content and a CRL time stamp which is invalidation date-and-time information corresponding to the content owner stored in the certificate revocation list (CRL); and a content-use control section prohibiting or restricting use of the content if the content-certificate time stamp has date-and-time data not earlier than the CRL time stamp.

Further, in the information processing apparatus according to the embodiment of the present invention, the content-certificate time stamp may be date-and-time information corresponding to a signature generation date and time by an issuer of the content certificate, and the CRL time stamp may be an expiration date and time of a content-owner certificate corresponding to each content owner, that is to say, date-and-time information corresponding to the content-owner invalidation date-and-time recorded on the content-owner certificate.

Moreover, in the information processing apparatus according to the embodiment of the present invention, the data verification section may further read the content-owner certificate from the disc to perform first signature verification, may further read content-certificate-enabled data having a signature for data including the content certificate to perform second signature verification, and the content-use control section may prohibit or restrict use of the content if the verification fails in the first signature verification and the second signature verification in the data verification section.

Further, in the information processing apparatus according to the embodiment of the present invention, the content-use control section may perform processing inhibiting or restricting playback, copy, or externally outputting of the content, or network-connection of the apparatus.

Further, in the information processing apparatus according to the embodiment of the present invention, the disc may be a recordable disc, and a content recorded on the disc is a content obtained and recorded by a user by download processing or through a shared terminal.

According to another embodiment of the present invention, there is provided a disc including: a content; a content certificate which is certification data corresponding to the content and includes a time stamp corresponding to a signature-generation date and time by an issuer of the content certificate; and a content-owner certificate which is a certificate corresponding to a content owner providing the content and stores content-owner identification, wherein in a player performing use processing of the content, if a certificate revocation list (CRL) including invalidation information of a content owner includes the content-owner identification recorded on the content-owner certificate, the player compares the content-certificate time stamp stored in the content certificate and a CRL time stamp stored in the certificate revocation list (CRL), and is allowed to prohibit or restrict the use processing of the content if the content-certificate time stamp has a date-and-time data not earlier than the CRL time stamp.

Further, in the disc according to the embodiment of the present invention, the content-owner certificate may include a signature for tamper verification, and the disc may further include content-certificate-enabled data having a signature for data including the content certificate, in a player performing the use processing of the content, verification of the signature included in the content-owner certificate and the content-certificate-enabled data may be performed, and if the signature verification is not successful, the player may be allowed to prohibit or restrict the use processing of the content.

According to another embodiment of the present invention, there is provided a method of processing information for controlling use of a content recorded on a disc in an information processing apparatus, the method including the steps of: in reference to a certificate revocation list (CRL) including invalidation information of a content owner providing the content, data verifying whether content-owner identification recorded in a content-owner certificate recorded on the disc as a certificate corresponding to the content owner is included in the certificate revocation list (CRL), and if the content-owner identification is included in the list, verifying data which compares a content-certificate time stamp stored in the content certificate recorded on the disc as a certificate corresponding to the content and a CRL time stamp which is invalidation date-and-time information corresponding to the content owner stored in the certificate revocation list (CRL); and a content-use control section content-use controlling which prohibits or restricts use of the content if the content-certificate time stamp has date-and-time data not earlier than the CRL time stamp.

Further, in the method of processing information according to the embodiment of the present invention, the content-certificate time stamp may be date-and-time information corresponding to a signature generation date and time by an issuer of the content certificate, and the CRL time stamp may be an expiration date and time of a content-owner certificate corresponding to each content owner, that is to say, date-and-time information corresponding to the content-owner invalidation date-and-time recorded on the content-owner certificate.

Further, in the method of processing information according to the embodiment of the present invention, the step of verifying data may further read the content-owner certificate from the disc to perform first signature verification, may further read content-certificate-enabled data having a signature for data including the content certificate to perform second signature verification, and the content-use control section prohibits or restricts use of the content if the verification fails in the first signature verification processing and the second signature verification processing in the data verification section.

Further, in the method of processing information according to the embodiment of the present invention, the content-use control section may perform processing inhibiting or restricting playback, copy, or externally outputting of the content, or network-connection of the apparatus.

According to another embodiment of the present invention, there is provided a program for causing an information processing apparatus to control use of a content recorded on a disc, the program including the steps of: in reference to a certificate revocation list (CRL) including invalidation information of a content owner providing the content, data verifying whether content-owner identification recorded in a content-owner certificate recorded on the disc as a certificate corresponding to the content owner is included in the certificate revocation list (CRL), and if the content-owner identification is included in the list, verifying data which compares a content-certificate time stamp stored in the content certificate recorded on the disc as a certificate corresponding to the content and a CRL time stamp which is invalidation date-and-time information corresponding to the content owner stored in the certificate revocation list (CRL); and a content-use-control section content-use controlling which prohibits or restricts use of the content if the content-certificate time stamp has date-and-time data not earlier than the CRL time stamp.

In this regard, a computer program of the present invention is a computer program capable of being provided through a storage medium and a communication medium in a computer readable format, for example, to a general-purpose computer system performing various kinds of program code. By providing such a program in a computer readable format, the processing in accordance with the program is performed on a computer system.

Other and further objects, features and advantages of the present invention will become apparent by the detailed description based on the following embodiments of the present invention and the accompanying drawings. In this regard, in this specification, a system is a logical set of a plurality of apparatuses, and is not limited to a set of constituent apparatuses that are contained in a same casing.

By an embodiment of the present invention, in reference to a certificate revocation list (CRL) including invalidation information of a content owner providing the content, verification is performed on whether content-owner identification recorded a content-owner certificate recorded on the disc is included in the certificate revocation list (CRL). If the content-owner identification is included in the list, comparison is performed between a time stamp stored in the content certificate and a time stamp in the certificate revocation list (CRL). If the content-certificate time stamp has date-and-time data not earlier than the CRL time stamp, use of the content is controlled to be prohibited or restricted. With this arrangement, it is possible to implement use restriction only on the content that has been invalidated without restricting use of the provided contents, the content owners of which have not been invalidated.

DESCRIPTION OF THE PREFERRED EMBODIMENTS

In the following, a detailed description will be given of an information processing apparatus, a disc, an information processing method, and a program according to an embodiment of the present invention with reference to the drawings.

Figure 1A:
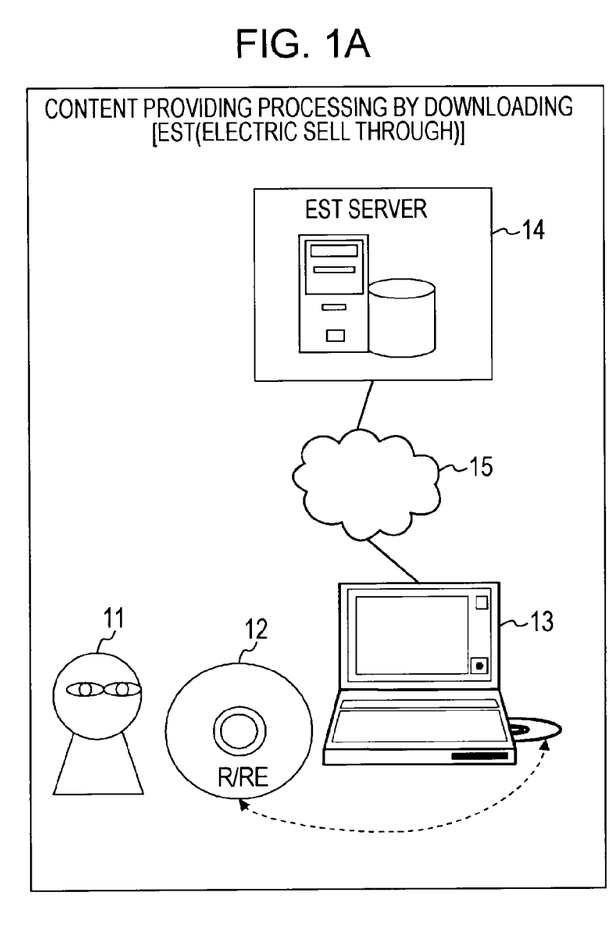
FIGS. 1A and 1B are diagrams illustrating overviews of EST (Electric Sell Through), which is content providing processing by downloading, and MoD (Manufacturing on Demand), which is content providing processing using a shared terminal, respectively.
Figure 1B:
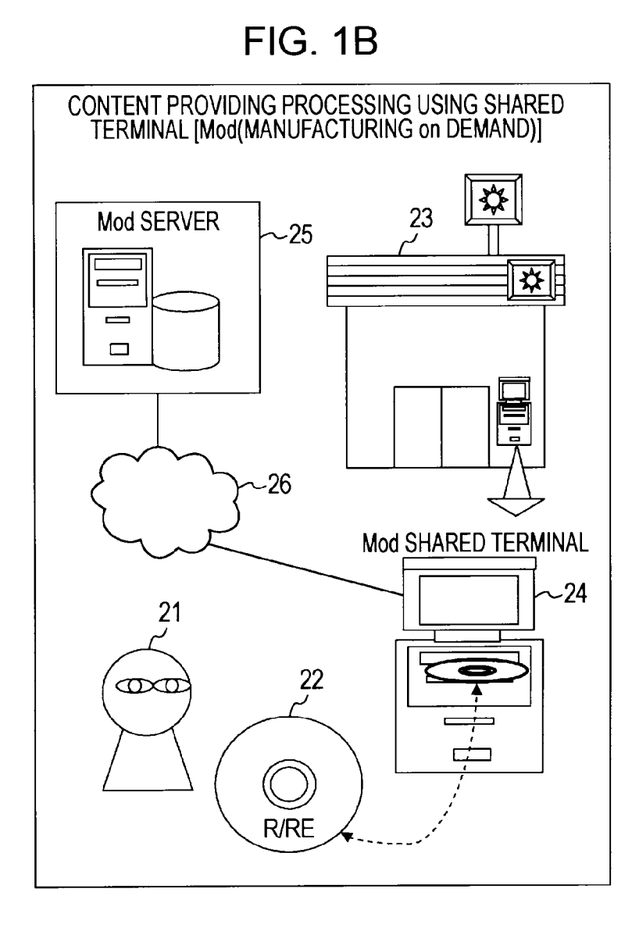

Contents are provided to users not only in the form of having been recorded on a ROM disc in advance. The users are allowed to perform download and record processing of contents from content servers to discs, such as recordable discs of an R type, an RE type, etc., possessed by the users. Also, the users are allowed to record and use contents using terminals installed at stores and public areas. First, with reference to FIG. 1, a description will be given of an overviews of EST (Electric Sell Through), which is content providing processing by downloading, and MoD (Manufacturing on Demand), which is content providing processing using a shared terminal.

Media on which the user records contents are possessed by the user, and include, for example, a DVD, a Blu-ray Disc (registered trademark), etc. Specifically, various kinds of media capable of recording data, such as a DVD-R, a DVD-RE, a BD (Blu-ray)-R, a BD-RE, etc., are used.

Exemplary processing shown in FIG. 1A is processing in which a user 11 loads a writable disc 12 possessed by the user 11 into an information processing apparatus 13, possessed by the user 11, such as a PC, receives a content and the management data thereof from a content server 14 through a network 15, and records them on the medium. This content providing processing is content providing processing by downloading, and called EST (Electric Sell Through). In this regard, the content server 14 is called an EST server.

Exemplary processing shown in FIG. 1B is processing in which the user 21 purchases and records a content using a shared terminal 24 installed at public areas, such as a convenient store and a station, for example. The user 21 sets a writable medium possessed by the user 21 in the shared terminal 24 at a convenient store 23, and records a desired content on a disc 22 by an operation by the user 21, such as a content selection, etc.

A content and the management data thereof are transmitted to the shared terminal 24 from a content server 25 connected to a network, and are recorded in a storage apparatus in the terminal 24. The content and the management data thereof stored in the storage apparatus in the terminal 24 are selected in response to a request of the user 21, and are recorded on the R-type or the RE-type disc 22, which is possessed by the user 21 and is a writable medium. This content providing processing is content providing processing by downloading, and called MoD (Manufacturing on Demand). In this regard, the content server 25 is called a MoD server.

Figure 2:
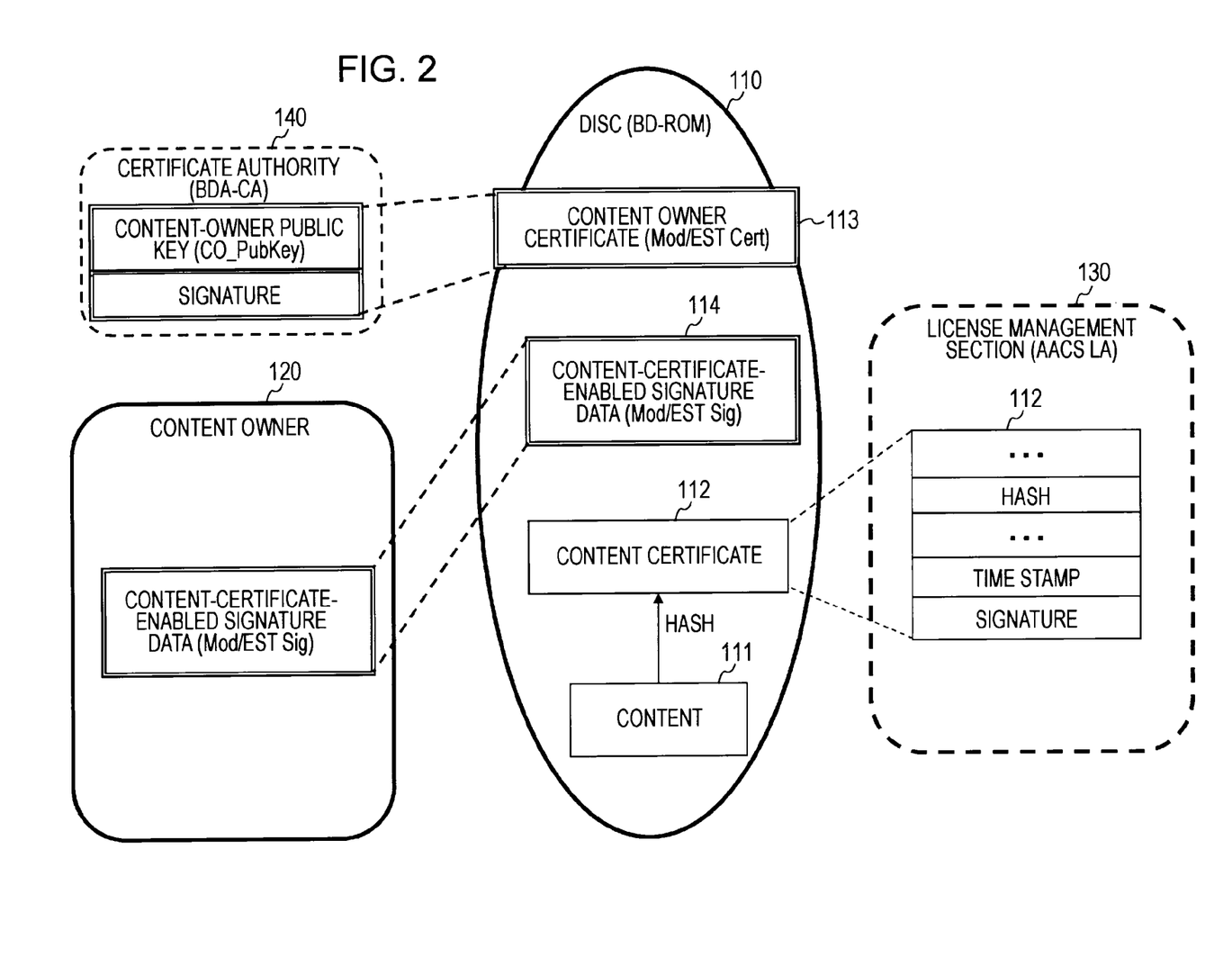
FIG. 2 is a diagram illustrating a structure for implementing content-use control according to an embodiment of the present invention.

Next, a description will be given of an overview of a configuration of the present invention with reference to FIG. 2. FIG. 2 illustrates a disc (medium) 110 on which a content 111 is stored. The disc (medium) 110 is, for example, a recordable R/RE-type disc. The content 111 is a content obtained and recorded by the user through the use of EST (Electric Sell Through), which is content providing processing by downloading, or MoD (Manufacturing on Demand), which is content providing processing using a shared terminal as described with reference to FIG. 1.

FIG. 2 further illustrates a content owner 120 providing the content 111, a license management section (AACS LA) 130 carrying out license management, such as use management of contents, etc., and a certificate authority (BDA-CA) 140. The license management section 130 is operated, for example by an AACS LA (Licensing Administrator) performing content use management in accordance with the AACS specification.

A content certificate (Content Cert) 112 for certifying that the content 111 is a valid content, that is to say, a valid content managed by the license management section (AACS LA) 130 is recorded on the disc 110. The content certificate 112 is issued under the control of the license management section 130 as data certifying the validity of the content 111 recorded on the disc 110. At the time of recording the content, the content certificate 112 is recorded on the disc 110 through the download processing from the server, or through a public terminal.

As shown in detail in the license management section 130 shown in FIG. 2, the content certificate 112 includes a hash value of the content constituent data, a time stamp corresponding to the issue date and time of the content certificate, and an electronic signature, which is added to the record data by the private key of the license management section (AACS LA) 130. The time stamp corresponds to the date and time of the generation of the electronic signature.

Also, as shown in the figure, the disc 110 includes each record data of the following:

(a) content-owner certificate (Mod/EST Cert) 113
(b) content-certificate-enabled signature data (Mod/EST Sig) 114

Figure 3:
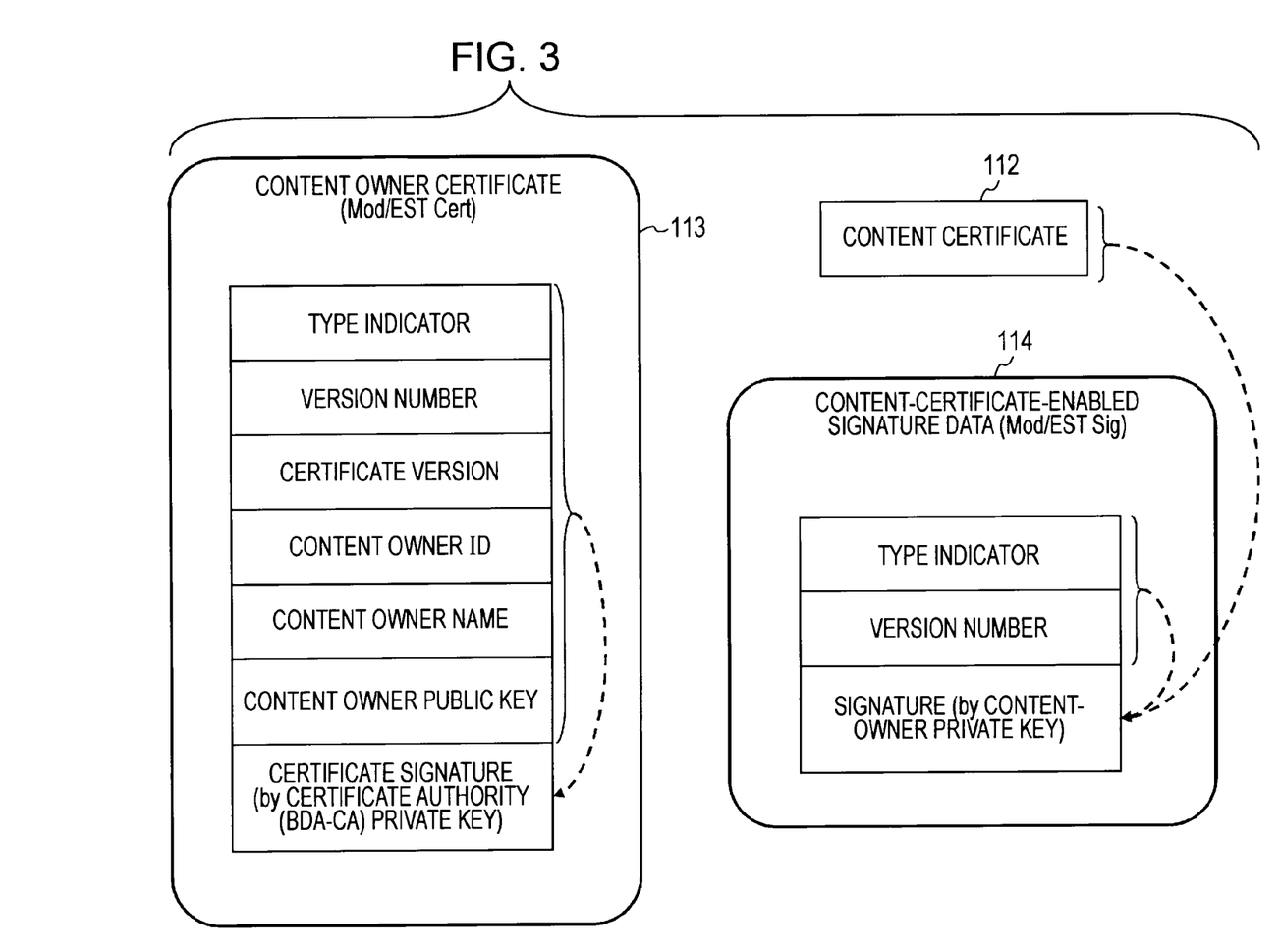
FIG. 3 is a diagram illustrating exemplary structures of a content-owner certificate (Mod/EST Cert) and a content-certificate-enabled signature data (Mod/EST Sig), which are recorded on a disc 110.

With reference to FIG. 3, a description will be given of exemplary data structures of the followings, which are recorded on the disc 110.

(a) content-owner certificate (Mod/EST Cert) 113
(b) content-certificate-enabled signature data (Mod/EST Sig) 114

The content-owner certificate (Mod/EST Cert) 113 has the following data structure, for example.

Type indicator: type of content-owner certificate (4 bytes),
Version number: version number of content-owner certificate (4 bytes),
Certificate version: version information of content-owner certificate (4 bytes),
Content-owner ID: identification of content owner (4 bytes),
Content-owner name: name of content owner (256 bytes),
Content-owner public key: public key of content owner, and
Signature: signature to content-owner certificate (Mod/EST Cert) generated by applying a private key of certificate authority (BDA-CA).

In this regard, the above-described content owner is a provider of the content 111 recorded on the disc 110.

The signature is a signature generated to the structure data (type indicator to content-owner public key) of the content-owner certificate (Mod/EST Cert) 113. It is possible to check whether the content-owner certificate (Mod/EST Cert) 113 has been tampered by the signature verification to which the public key of the certificate authority (BDA-CA) 140 is applied.

On the other hand, as shown in FIG. 3, the content-certificate-enabled signature data (Mod/EST Sig) 114 includes:

Type indicator: type of content-certificate-enabled signature data (4 bytes),

Version number: version number of content-certificate-enabled signature data (4 bytes), and Signature: signature to content certificate 112 and constituent data (type indicator, version number) of the content-certificate-enabled signature data 114, generated by applying a private key of the content owner having provided the content.

In this regard, by the signature verification on the signature, which employs the public key of the content owner, it is possible to check whether the content certificate 112 and the content-certificate-enabled signature data (Mod/EST Sig) 114 have been tampered or not.

Figure 4:
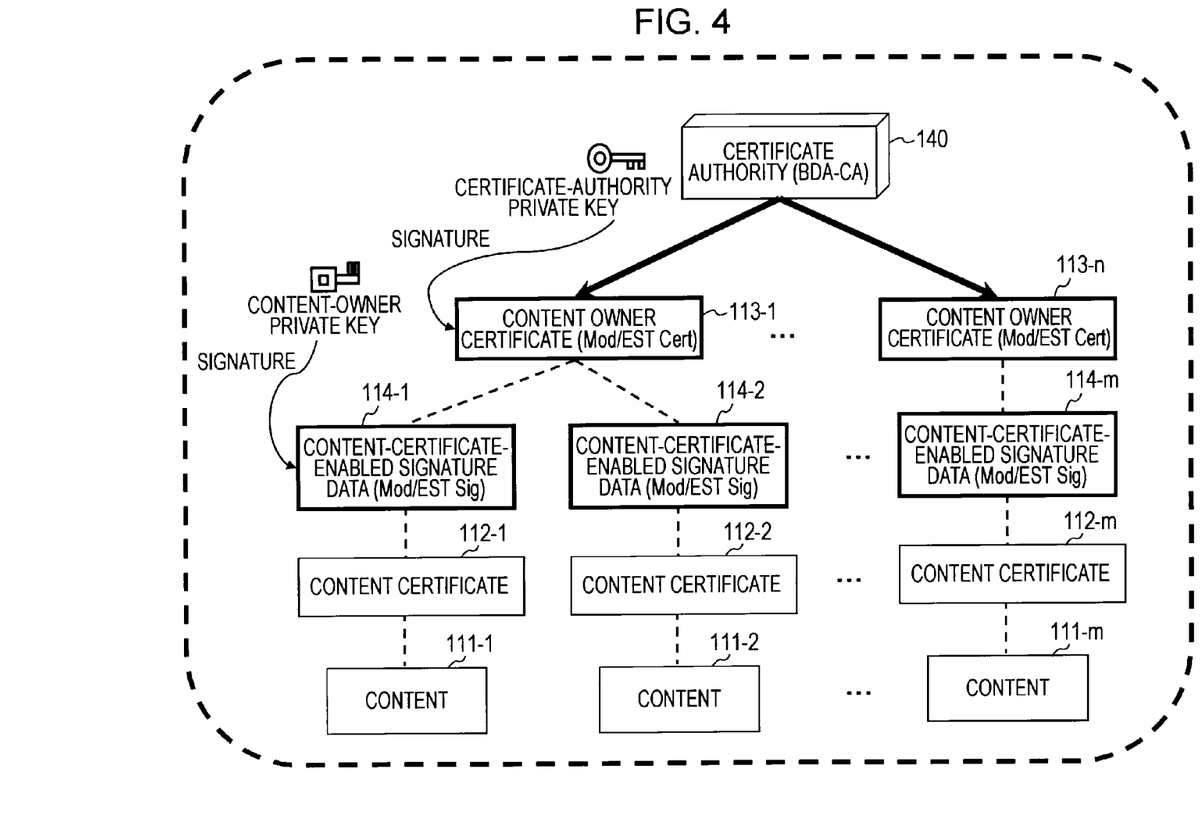
FIG. 4 is a diagram illustrating an exemplary structure for issuing the content-owner certificate (Mod/EST Cert) and the content-certificate-enabled signature data (Mod/EST Sig)

With reference to FIG. 4, a description will be given of the configuration for issuing the content-owner certificate (Mod/EST Cert) 113 and the content-certificate-enabled signature data (Mod/EST Sig) 114.

FIG. 4 illustrates a tree structure having a certificate authority at its highest level and a content at its lowest level. The structure includes the following components in sequence from a top level.

(a) Certificate authority (BDA-CA) 140,
(b) Content-owner certificate (Mod/EST Cert) 113,
(c) Content-certificate-enabled signature data (Mod/EST Sig) 114,
(d) Content certificate (Content Cert) 112, and
(e) Content 111.

As described with reference to FIG. 3, a signature by the public key of the certificate authority 140 is put on the content-owner certificate (Mod/EST Cert) 113, which is a certificate under the control of the certificate authority and stores the public key of the content owner.

A signature by a private key of the content owner is put on the content-certificate-enabled signature data (Mod/EST Sig) 114, which can be subjected to signature verification by the content-owner public key stored in the content-owner certificate (Mod/EST Cert) 113. The signature verification makes it possible to verify the validity (whether the data has been tampered or not).

As described with reference to FIG. 3, the signature put on the content-certificate-enabled signature data (Mod/EST Sig) 114 includes the constituent data of the content certificate as the signature target. If the signature of the content-owner certificate (Mod/EST Cert) 113 is successful, it becomes possible to verify the validity of the content certificate 112.

As described with reference to FIG. 2, for the content certificate (Content Cert) 112, a signature by a private key of the license management section (AACS LA) 130 is put on the data including a hash value of the content, a time stamp, etc. It becomes possible to verify the validity (whether the data has been tampered or not) by performing signature verification by the public key of the license management section (AACS LA) 130.

The content certificate (Content Cert) 112 includes a content hash value. If the hash value calculated using the content 111 recorded on the disc and the hash value recorded in the content certificate (Content Cert) 112 match, it is verified that the content 111 is a valid content which has not been tampered.

As shown in FIG. 4, the following components are interrelated, and thus it becomes possible for the certificate authority 140 to indirectly put the content 111 under control. Also, it becomes possible for the certificate authority 140 to put the content owner who is the provider of the content under control.

(a) Certificate authority (BDA-CA) 140,
(b) Content-owner certificate (Mod/EST Cert) 113,
(c) Content-certificate-enabled signature data (Mod/EST Sig) 114,
(d) Content certificate (Content Cert) 112, and
(e) Content 111.

In this regard, the content owner is given the authority to provide a content to the user by receiving the content-owner certificate (Mod/EST Cert) 113 from the certificate authority 140. That is to say, the content owner is allowed to provide the content to the user using EST (Electric Sell Through), which is content providing processing by downloading, and MoD (Manufacturing on Demand), which is content providing processing using a shared terminal, which is described with reference to FIG. 1 before.

However, the content distribution right is not guaranteed permanently. For example, if illegality of a content owner has been revealed, it is possible to remove the content distribution right of the content owner under the authority of the certificate authority 140. The certificate authority 140 issues a certificate revocation list (CRL) as invalidation information of the content owner. The certificate revocation list (CRL) can be freely obtained through a disc, or the management server of the certificate authority, etc., and is updated successively.

Figure 5:
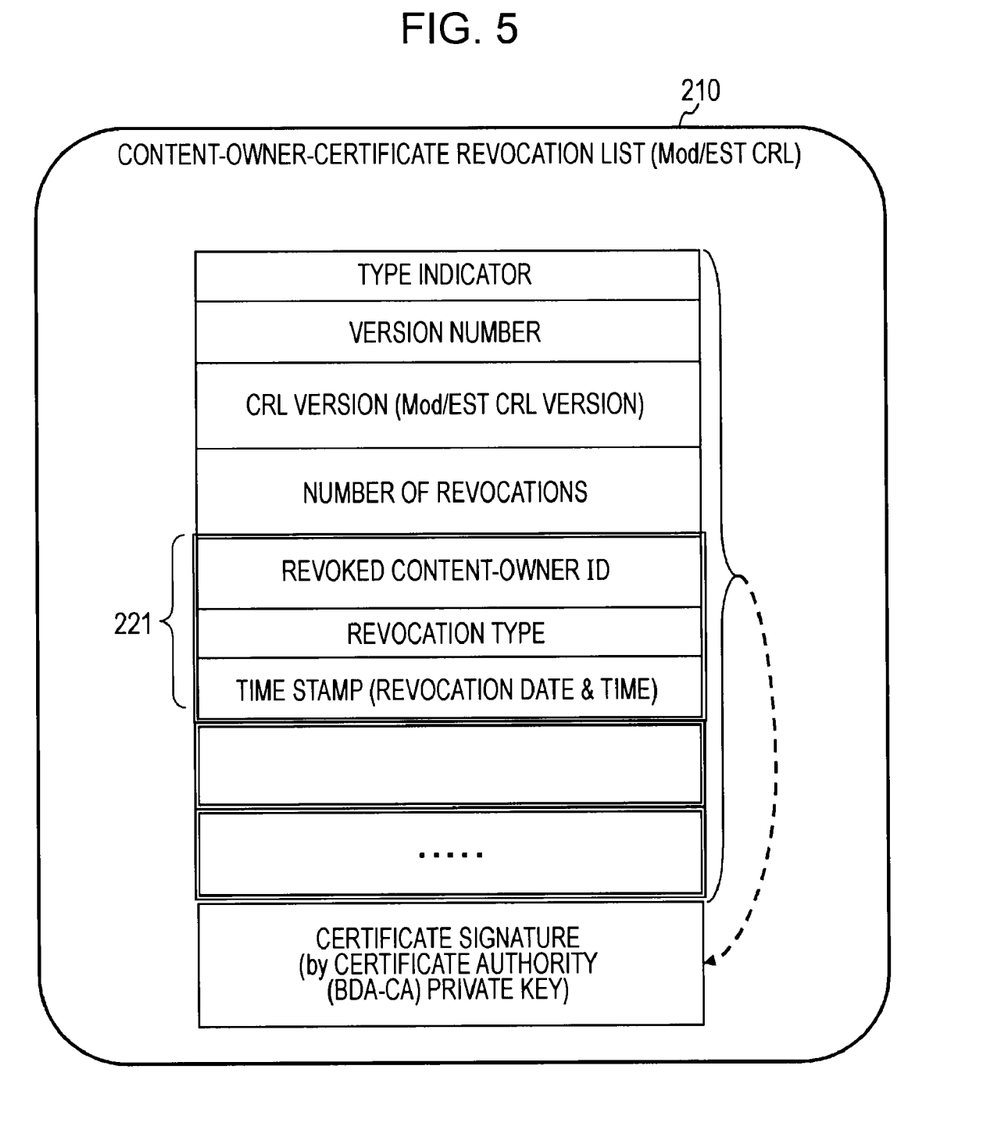
FIG. 5 is a diagram illustrating an exemplary data structure of a certificate revocation list (CRL)

The certificate revocation list (CRL) is a list holding identification information of invalidated content owners, and a signature is put on the list by applying a private key of the certificate authority. FIG. 5 illustrates an exemplary data structure of the certificate revocation list (CRL).

As shown in FIG. 5, the certificate revocation list (CRL) 210 includes:

Type indicator: type of certificate revocation list (CRL) (4 bytes),

Version number: version number of certificate revocation list (CRL) (4 bytes),

CRL version: version information of certificate revocation list (CRL) (4 bytes), Number of revocations: number of revoked content owners (4 bytes), Revoked content-owner ID: identification of revoked content owner (4 bytes), Revocation type: type of revocation, Time stamp (revocation date & time): date and time when revocation is performed, and Signature: signature to the certificate revocation list generated by applying the private key of the certificate authority (BDA-CA).

In this regard, the revoked content-owner ID, the revocation type, and the time stamp (revoked date and time): the revocation (invalidation)-performed date and time are content-owner unit data 221, which are recorded for each revoked content owner. That is to say, if a plurality of (n) content owners are revoked, n pieces of content-owner unit data 221 are recorded. If a plurality of (n) content owners are revoked, a time stamp as invalidation date and time is put for each content owner.

The signature is generated by applying a private key of the certificate authority (BDA-CA) 140 to the constituent data (type indicator to content-owner unit data 221) of the certificate revocation list (CRL) 210. It is possible to determine whether the certificate revocation list (CRL) 210 has been tampered or not by the signature verification using the public key of the certificate authority (BDA-CA) 140.

A time stamp as invalidation-date-and-time information for each content owner is put on the certificate revocation list (CRL). At the same time, as described before with reference to FIG. 2, a time stamp as content-certificate issued date and time information is also put on the content certificate issued by the license management section (AACS LA) 130 corresponding to each content.

When the user uses a content 111 recorded on the disc, that is to say, a content that a content owner provided to the user using Mod or EST described before with reference to FIG. 1 and that was recorded on the disc, a player to which the disc is loaded checks the revocation state of the content owner corresponding to the content to be played back by the certificate revocation list (CRL) 210. Further, the player checks the validity of the content using the content certificate 112 set corresponding to the content. At this time, the player compares the time stamps set in the following two pieces of data, and performs use control of content depending on the comparison result.

(1) the time stamp corresponding to the content owner set on the certificate revocation list (CRL) 210

(2) the time stamp set in the content certificate

A description will be given of the time-stamp comparison processing performed by the player with reference to FIG. 6.

Figure 6:
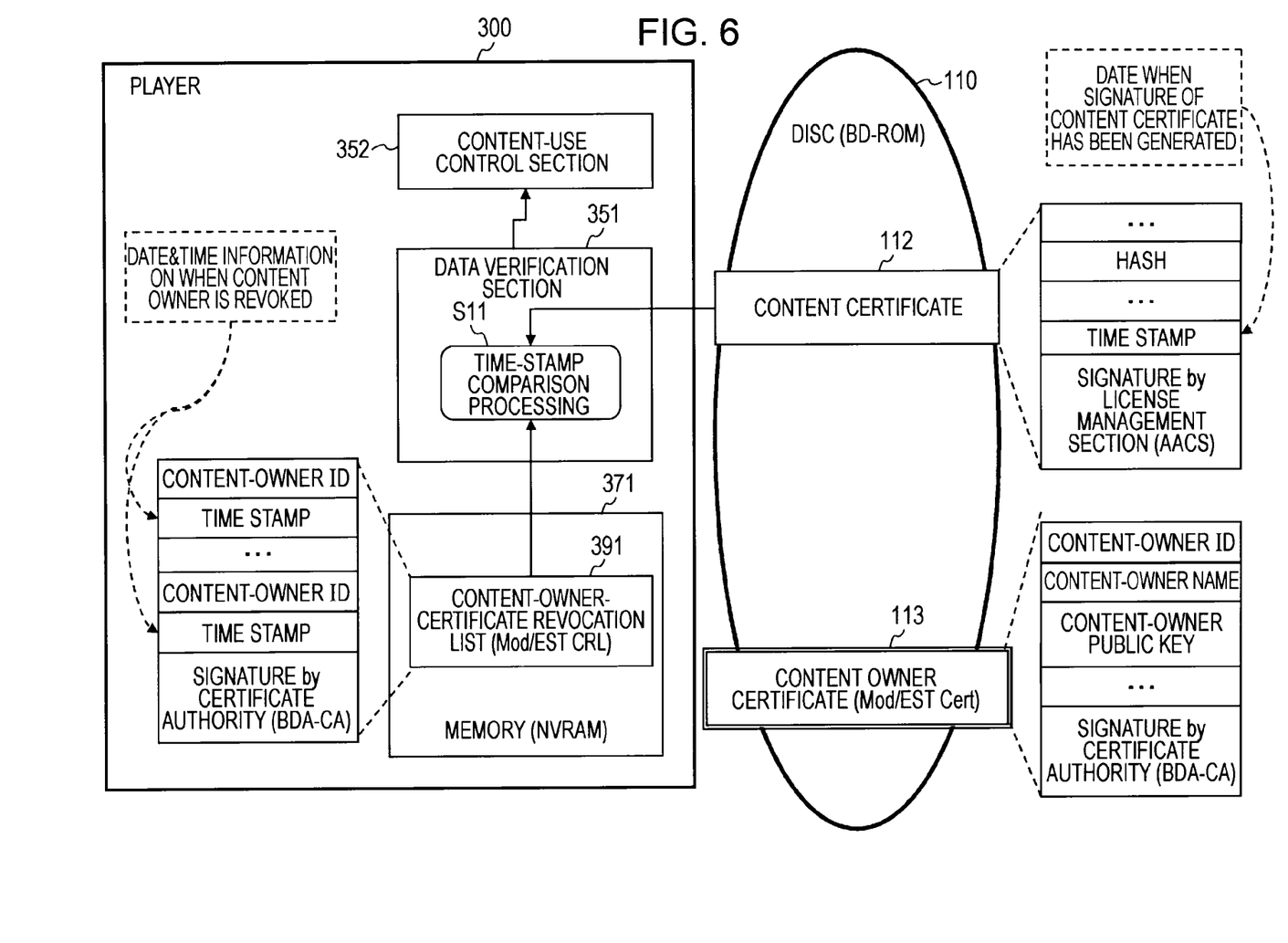
FIG. 6 is a diagram illustrating time-stamp comparison processing performed by a player.

FIG. 6 illustrates a disc 110 and a player 300. Only the content certificate 112 and the content-owner certificate (Mod/EST Cert) 113 are shown on the disc 110. However, the other data, such as contents are recorded on the disc 110 in the same manner as described with reference to FIG. 2.

As described before with reference to FIG. 2, the content certificate (Content Cert) 112 is data for certifying that the content recorded on the disc is a valid content, that is to say, a valid content managed by the license management section (AACS LA). The content certificate 112 is issued under the control of the license management section as data certifying the validity of the content, corresponding to the content, and is recorded on the disc 110.

As described before with reference to FIG. 2, the content certificate 112 includes a hash value of the content constituent data, and further includes the date-and-time information of when the license management section (AACS LA) created the signature to the content certificate 112, that is to say, the time stamp corresponding to the issue date and time of the content certificate 112, and a signature, which is put on this record data by the private key of the license management section (AACS LA). Accordingly, if the time stamp is tampered, the signature verification fails, and thus it is revealed that there has been tampering.

At the same time, the content-owner certificate (Mod/EST Cert) 113, shown in FIG. 6 in an abbreviated form, has the same structure as described before with reference to FIG. 3. The structure includes the following data components.

Type indicator: type of content-owner certificate (4 bytes),

Version number: version number of content-owner certificate (4 bytes),

Certificate version: version information of content-owner certificate (4 bytes), Content-owner ID: identification of content owner (4 bytes), Content-owner name: name of content owner (256 bytes), Content-owner public key: public key of content owner, and Signature: signature to content-owner certificate (Mod/EST Cert) generated by applying a private key of certificate authority (BDA-CA).

In this regard, the above-described content owner is a provider of the content 111 recorded on the disc 110.

The signature is a signature generated to the structure data (type indicator to content-owner public key) of the content-owner certificate (Mod/EST Cert) 113. It is possible to check whether the content-owner certificate (Mod/EST Cert) 113 has been tampered by the signature verification to which the public key of the certificate authority (BDA-CA) 140 is applied.

Before the player 300 uses the content recorded on the disc 110, the player 300 obtains the certificate revocation list (CRL) 391 from the server or the disc in advance, and stores it in a memory 371 of the player 300.

The certificate revocation list (CRL) 391 stores invalidation information of the content owner who has provided the content recorded on the disc. As described with reference to FIG. 5, a time stamp as the invalidation date and time information for each content owner is set in the list.

In this regard, the certificate revocation list (CRL) 391 is updated successively. The player 300 obtains a new certificate revocation list (CRL) 391 from the disc or the server, and stores the obtained certificate revocation list (CRL) 391 in the memory (NVRAM) 371 of the player 300 to use it.

In step S11 shown in FIG. 6, a data verification section 351 of the player 300 compares the following two time stamps.

(a) the time stamp of the content certificate (b) the time stamp of the certificate revocation list (CRL)

In this regard, the time stamps to be compared are the time stamp of the content certificate corresponding to the content recorded on the disc to be play backed and the time stamp of the certificate revocation list (CRL) on the content owner who has provided the content.

In the time-stamp comparison processing, if the time stamp of the content certificate is date and time data which is not earlier than the time stamp of the certificate revocation list (CRL), a content-use-control section 352 of the player 300 prohibits or restricts use of the content recorded on the disc.

If the time stamp of the content certificate is date and time data which is earlier than the time stamp of the certificate revocation list (CRL), the content-use-control section 352 does not prohibit or restrict use of the content recorded on the disc. However, as described later with reference to a flowchart in FIG. 7, if the signature verification of the content-owner certificate (Mod/EST Cert) and the content-certificate-enabled signature data (Mod/EST Sig) fails, the content-use-control section 352 prohibits or restricts use of the content recorded on the disc.

In the present embodiment, a content owner is invalidated by the time stamp of the certificate revocation list (CRL) updated successively. That is to say, the invalidation date and time of the content recorded on the disc provided by the content owner is checked. The content of the disc on which a content certificate having a time stamp not earlier than this invalidation date and time is subjected to use prohibition and restriction. For the content of the disc on which a content certificate having a time stamp earlier than this invalidation date and time, if the signature verification of the content-owner certificate and the content-certificate-enabled signature data is successful, use of the content is not prohibited nor restricted.

Figure 7:
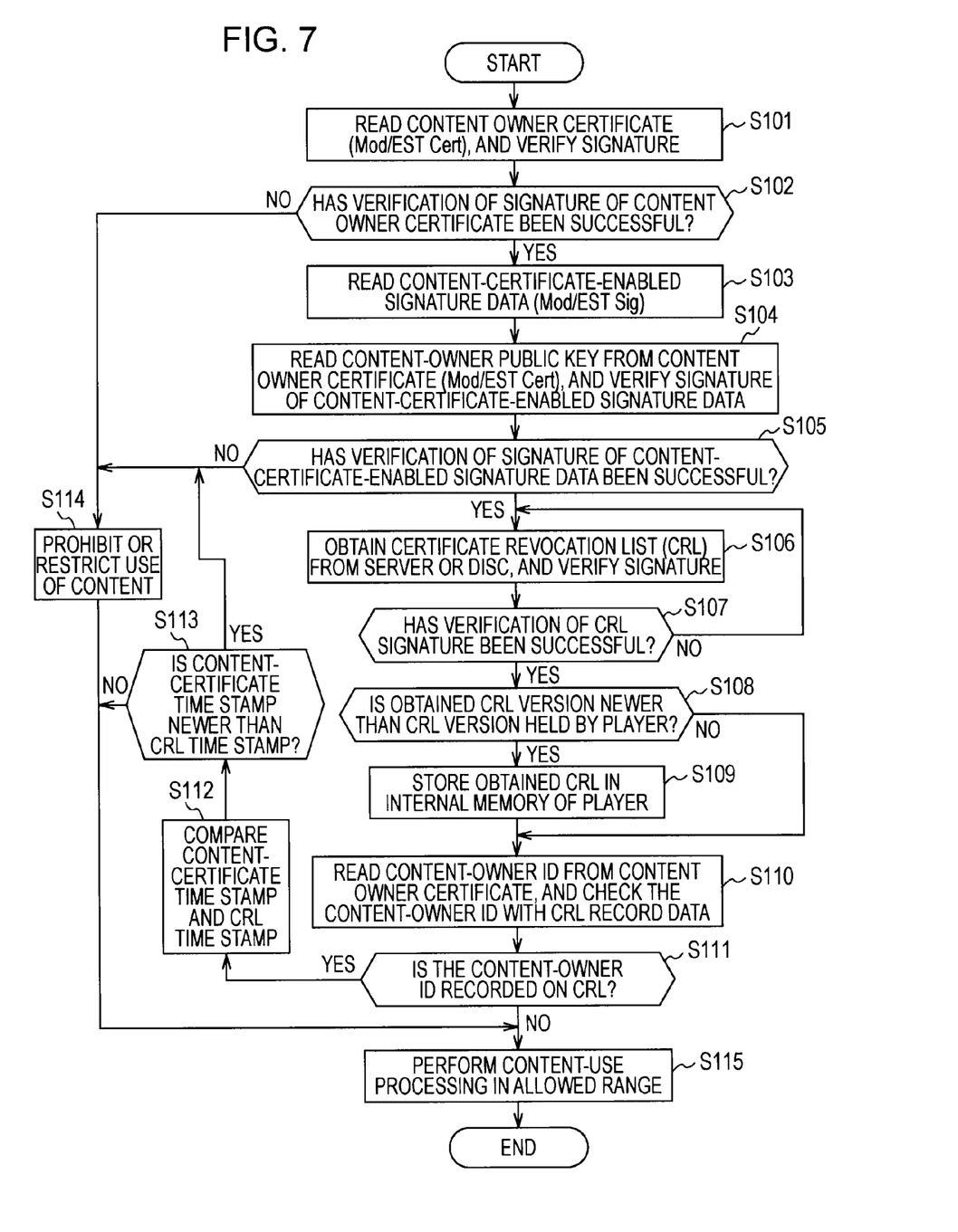
FIG. 7 is a flowchart illustrating a processing sequence executed by a data processing section of the player.

A description will be given of a processing sequence performed by a data processing section of the player with reference to the flowchart shown in FIG. 7.

First, in step S101, the data processing section reads the content-owner certificate (Mod/EST Cert) from the disc, and performs verification on the signature put on the content-owner certificate (Mod/EST Cert). In step S102, a determination is made on whether the signature verification of the content-owner certificate has been successful or not, that is to say, whether the content-owner certificate has been verified that the content-owner certificate is a valid certificate without tampering by the signature verification.

As described before with reference to FIG. 3, etc., the content-owner certificate (Mod/EST Cert) is a certificate issued by the certificate authority (BDA-CA), and includes signature data by the private key of the certificate authority (BDA-CA) against the public key of the content owner. The verification of the signature makes it possible to verify whether the content-owner certificate has been tampered or not. For example, it is possible to check whether the content-owner public key put on the content-owner certificate (Mod/EST Cert) is a valid key data.

In step S102, if it is determined that the signature verification of the content-owner certificate has failed, that is to say, if it is determined that the content-owner certificate has not been verified as a valid certificate without tampering, the processing proceeds to step S114. In step S114, use of the content recorded on the disc is prohibited or restricted. Specifically, for example, by any one of or the combination of the followings, the player restricts use of the content.

(1) prohibition of playing back the content recorded on the disc,
(2) prohibition of copying the content recorded on the disc,
(3) prohibition of externally outputting the content recorded on the disc, and
(4) prohibition of connecting to a network.

After that, in step S115, the player performs content-use processing in an allowed range under the control of the content-user control section.

On the other hand, in step S102, if it is determined that the signature verification of the content-owner certificate has been successful, that is to say, if it is determined that the content-owner certificate has been verified as a valid certificate without tampering, the processing proceeds to step S103.

In step S103, the data processing section reads the content-certificate-enabled signature data (Mod/EST Sig) from the disc, and performs signature verification on the content-certificate-enabled signature data by applying the content-owner public key stored in the content-owner certificate in step S104. The key to be applied for the signature verification is the content-owner public key stored in the content-owner certificate whose validity has been verified in step S102.

As described before with reference to FIG. 3, etc., the content-certificate-enabled signature data is the signature data generated by the content owner. The signature data is generated by applying the private key of the content owner to the data including the content certificate recorded on the disc. By verifying the signature put on the content-certificate-enabled signature data (Mod/EST Sig), it becomes possible to verify whether there has been tampering with the content certificate and the content-certificate enabled signature data.

In step S105, a determination is made on whether the verification of the content-certificate-enabled signature data has been successful or not. That is to say, a determination is made, by the signature verification, on whether the content certificate and the content-certificate-enabled signature data have been verified that the data are valid without tampering. In step S105, if it is determined that the content-owner certificate and the content-certificate-enabled signature data have not been verified as valid data without tampering, the processing proceeds to step S114. In step S114, use of the content recorded on the disc is prohibited or restricted. Specifically, as described above, for example, by any one of or the combination of the followings, the player restricts use of the content.

(1) prohibition of playing back the content recorded on the disc,
(2) prohibition of copying the content recorded on the disc,
(3) prohibition of externally outputting the content recorded on the disc, and
(4) prohibition of connecting to a network.

After that, in step S115, the player performs content-use processing in an allowed range under the control of the content-user control section.

On the other hand, in step S105, if it is determined that the content-owner certificate and the content-certificate-enabled signature data have been verified as valid data without tampering, the processing proceeds to step S106. In step S106, the certificate revocation list (CRL) is obtained from the server or the disc, and the signature verification processing is performed on the obtained certificate revocation list (CRL).

As described before with reference to FIG. 5, the certificate revocation list (CRL) is a list on invalidated content-owner certificates, that is to say, on the invalidated content owners. A time stamp as invalidation date-and-time information for each content owner is recorded on the certificate revocation list (CRL) together with content-owner identification, a content-owner name, and the like. A signature by the private key of the certificate authority who has issued the certificate is put on the certificate revocation list (CRL), and thus the certificate revocation list (CRL) has a data structure capable of verification against tampering by the signature verification using the public key of the certificate authority.

The certificate revocation list (CRL) is updated successively, and thus a latest list can be obtained from the management server who has issued the certificate. Also, the certificate revocation list (CRL) is recorded on the disc to be provided to the user. In this regard, version information is set in the certificate revocation list (CRL), and thus a determination on whether old or new is possible.

In step S106, signature verification on the certificate revocation list (CRL) is performed. In step S107, if the signature verification of the certificate revocation list (CRL) has failed, the CRL might be illegal, the processing returns to step S106, a new certificate revocation list (CRL) is obtained from the server, and the signature verification is performed on the obtained certificate revocation list (CRL).

In step S107, if the signature verification of the certificate revocation list (CRL) has been successful, and the validity of the certificate revocation list (CRL) has been confirmed, the processing proceeds to step S108.

In step S108, a comparison is made between the version of the certificate revocation list (CRL) stored in the memory of the player and the version of the certificate revocation list (CRL), obtained from the server or the disc, with which the signature verification has been performed. If the certificate revocation list (CRL), obtained from the server or the disc, with which the signature verification has been performed, is determined to be newer than the certificate revocation list (CRL) stored in the player, in step S109, the certificate revocation list (CRL), obtained from the server or the disc, with which the signature verification has been performed, is stored in the memory of the player.

In step S110, the content-owner ID is read from the content-owner certificate, and is checked with the recording data of the certificate revocation list (CRL), obtained from the server or the disc, with which the signature verification has been performed.

In step S111, if it is determined that the content-owner ID recorded in the content-owner certificate is not recorded on the CRL list, in step S115, the player performs content-use processing in an allowed range under the control of the content-use control section. In this case, for example, it becomes possible to perform content-use processing in accordance with the use control information recorded on the disc with the content.

On the other hand, in step S111, if it is determined that the content-owner ID recorded in the content-owner certificate is recorded on the CRL list, the processing proceeds to step S112.

In step S112, the time-stamp comparison processing described before with reference to FIG. 6 is performed. That is to say, the player compares the following two time stamps.

(a) the content-certificate time stamp, and
(b) the certificate-revocation-list (CRL) time stamp In this regard, the time stamps to be compared are the time stamp of the content certificate corresponding to the content recorded on the disc to be used, and the time stamp of the certificate revocation list (CRL) on the content owner who has provided the content.

In step S113, if the time stamp of the content certificate corresponding to the content to be used is determined to be not earlier than the date and time data of the time stamp set as data corresponding to the content owner, recorded on the certificate revocation list (CRL), who has provided the content to be used, it is determined that the content recorded on the disc is a content obtained after the content owner has been invalidated, and the processing proceeds to step S114. Then, use of the content recorded on the disc is prohibited or restricted. Specifically, as described above, for example, by any one of or the combination of the followings, the player restricts use of the content.

(1) prohibition of playing back the content recorded on the disc
(2) prohibition of copying the content recorded on the disc
(3) prohibition of externally outputting the content recorded on the disc
(4) prohibition of connecting to a network After that, in step S115, the player performs content-use processing in an allowed range under the control of the content-user control section.

On the other hand, in step S113, if the time stamp of the content certificate is determined to be date and time data earlier than the time stamp of the certificate revocation list (CRL), it is determined that the content recorded on the disc is a content recorded on the disc before the content owner has been invalidated. Thus, the processing proceeds to step S115 without prohibiting or restricting use of the content recorded on the disc. In step S115, the player performs content-use processing in an allowed range under the control of the content-use control section. For example, it becomes possible to use the content in accordance with the content-use control information recorded on the disc separately.

In this manner, in the configuration of the present invention, the data verification section of the player 300 compares the following two time stamps.

(a) the content-certificate time stamp
(b) the certificate-revocation-list (CRL) time stamp If the time stamp of the content certificate is date and time data which is not earlier than the time stamp of the certificate revocation list (CRL), the content-use-control section of the player 300 prohibits or restricts use of the content recorded on the disc. If the time stamp of the content certificate is date and time data which is earlier than the time stamp of the certificate revocation list (CRL), when the above-described signature verification, that is to say, the signature verification of the content-owner certificate (Mod/EST Cert) and the content-certificate enabled signature data (Mod/EST Sig) have been successful, the content-use-control section does not prohibit or restrict use of the content recorded on the disc. With this arrangement, it becomes possible to eliminate adverse effects of restricting use of the contents recorded before the invalidation of the content owners.

In this regard, when the user records a content on a disc possessed by the user using EST (Electric Sell Through), which is content providing processing by downloading, and MoD (Manufacturing on Demand), which is content providing processing using a shared terminal, which are described before with reference to FIG. 1, a plurality of contents are sometimes recorded on one sheet of disc in sequence.

Figure 8:
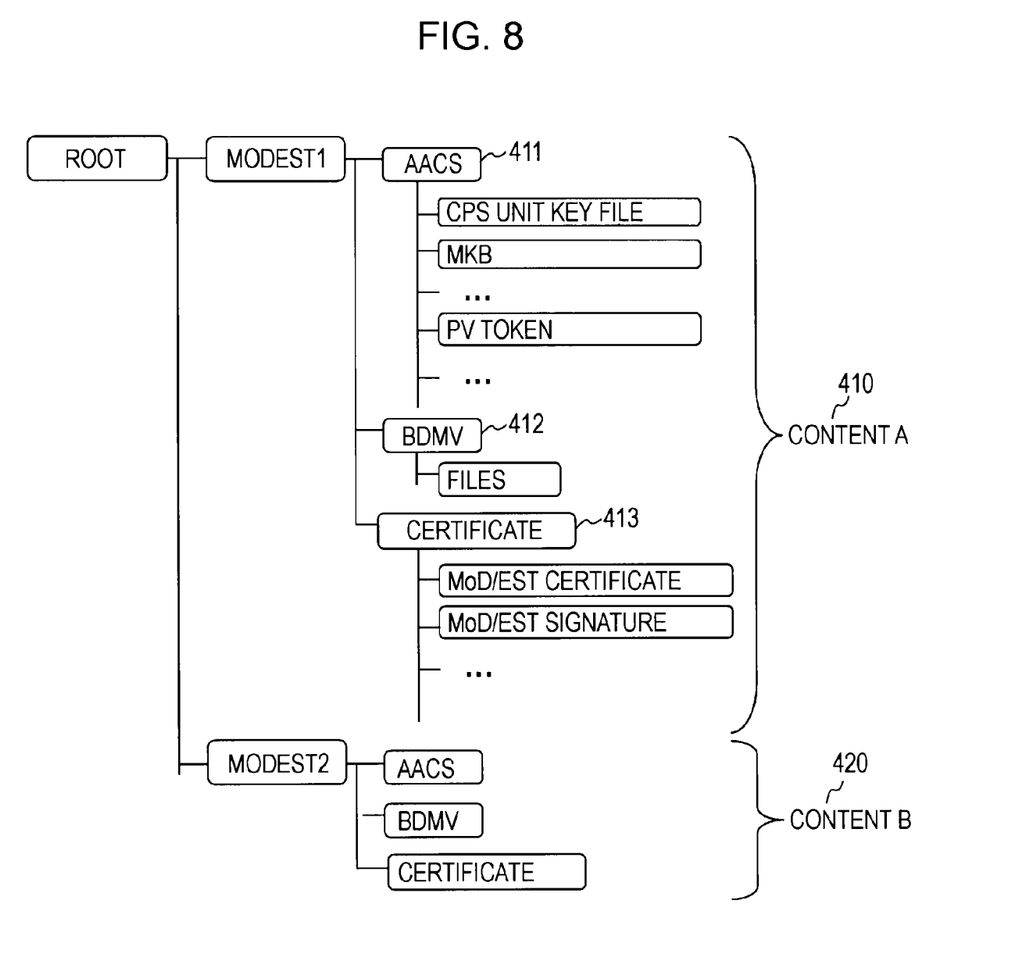
FIG. 8 is a diagram illustrating an exemplary structure of content recording directories on a disc.
Figure 9:
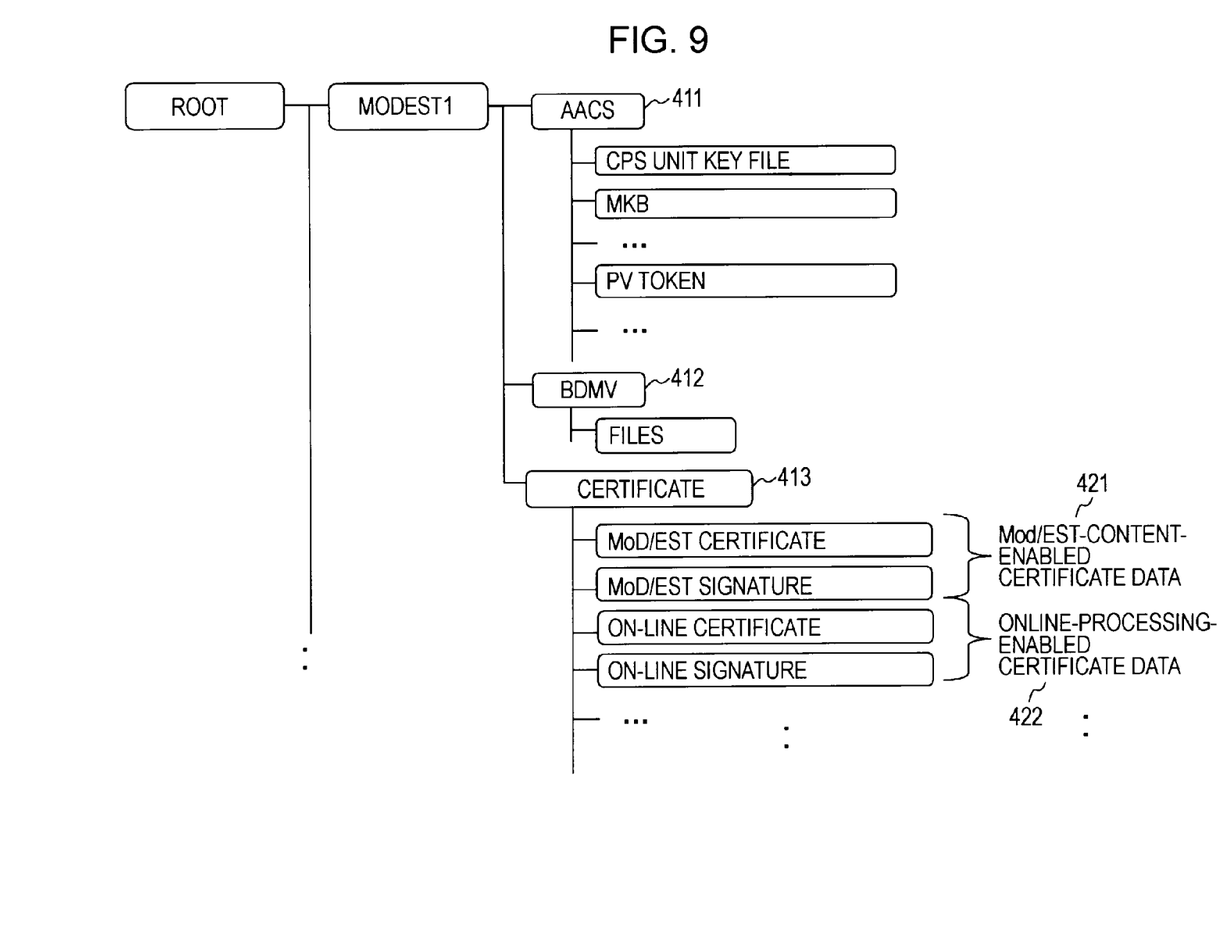
FIG. 9 is a diagram illustrating an exemplary structure of content recording directories on a disc.

When a plurality of contents are recorded on one sheet of disc in this manner, it is desirable to record management information, such as a content certificate, etc., for each content. FIGS. 8 and 9 illustrate examples of content recording directories on a disc.

The example of directories shown in FIG. 8 illustrates a directory 410 for a content A and a directory 420 for a content B. These directories are set as directories corresponding to contents recorded, for example, at individually different timing on a disc using EST (Electric Sell Through) or MoD (Manufacturing on Demand).

Each of the directories includes an AACS directory 411, in which content management information corresponding to AACS is stored, a content (BSMV) directory 412, in which content entity data, etc., is stored, and a certificate-data directory 413, in which certificate data under the control of the certificate authority, such as content-owner certificate data (Mod/EST Cert) and content-certificate-enabled signature data (Mod/EST Sig), described in the above-described embodiment in detail, are stored.

Each time a new content is recorded on the disc, a new directory including these three kinds of directories is set up. When the content is played back, the AACS management data and the certificate data set individually in each directory [Modest1, 2, 3, . . . ] are selected, and the processing in accordance with the processing sequence described with reference to FIG. 7 is performed.

FIG. 9 illustrates a directory corresponding to one content. In the same manner as shown in FIG. 8, FIG. 9 illustrates an example including an AACS directory 411, in which content management information corresponding to AACS is stored, a content (BSMV) directory 412, in which content entity data, etc., are stored, and a certificate-data directory 413, in which certificate data under the control of the certificate authority, such as a content-owner certificate (Mod/EST Cert) and a content-certificate-enabled signature data (Mod/EST Sig) are stored.

In the example shown in FIG. 9, a certificate-data directory 413 includes online-processing-enabled certificate data 422 including an online certificate (On-line Cert) and an online-certificate-enabled signature data (On-line Sig) in addition to Mod/EST-content-enabled certificate data 421 including the content-owner certificate (Mod/EST Cert) and the content-certificate-enabled signature data (Mod/EST Sig).

The content-owner certificate (Mod/EST Cert) and the content-certificate-enabled signature data (Mod/EST Sig) are the certificate data to be applied for performing use control of the content obtained using Mod or EST. In addition to such contents, for example, a program generated by Java (registered trademark), etc., is sometimes recorded. Specifically, an exemplary program is a program which obtains ID information, such as medium ID recorded on the disc, transmits the ID information to a server connected to a network, and receives additional information corresponding to the content.

A provider of such a program can be managed in the same manner as the above-described content provider. The above-described example is the case of setting up an online certificate (On-line Cert) and an online-certificate-enabled signature data (On-line Sig) as certificate data to be applied to the management processing of such a program provider.

The online certificate (On-line Cert) is certificate data containing data, such as the public key of the provider of the program, such as Java (registered trademark), etc., and is the data corresponding to the content-owner certificate (Mod/EST Cert).

The online-certificate-enabled signature data (On-line Sig) is the data corresponding to the content-certificate-enabled signature data (Mod/EST Sig). In addition to this, it becomes possible to record certificate data corresponding to various data recorded on the disc, and to perform use control of the content and the program recorded on the disc using the certificate data.

The present invention has been explained in detail by referring to the specific embodiments. However, it is obvious that those skilled in the art can perform modifications and substitutions on the embodiments without departing from the spirit of the present invention. That is to say, the present invention has been disclosed in a form of an example, and should not be limitedly interpreted. In order to determine the gist of the present invention, the appended claims should be taken into account.

Also, the series of processing described in the specification can be executed by hardware or by software or by the combination of both of these. When the processing is executed by software, the programs recording the processing sequence may be installed in a memory of a computer built in a dedicated hardware. Alternatively, the various programs may be installed and executed in a general-purpose computer capable of executing various processing. For example, the programs may be recorded in a recording medium in advance. In addition to installation from a recording medium to a computer, the programs may be received through a network, such as a LAN (Local Area Network) and the Internet, and may be installed in a recording medium, such as an internal hard disk, etc.

In this regard, the various processing described in this specification may be executed not only in time series in accordance with the description, but also may be executed in parallel or individually in accordance with the processing ability of the apparatus executing the processing or as necessary. Also, a system in this specification is a logical set of a plurality of apparatuses, and is not limited to a set of constituent apparatuses that are contained in a same casing.

What is claimed is:

1. An information processing apparatus for controlling use of a content recorded on a disc, comprising:
  a memory including
    a data verification section configured to
      verify whether content-owner identification recorded in a content-owner certificate corresponds to an owner of the content recorded on the disc, the content-owner certificate being recorded on the disc, and
      verify whether the content-owner certificate and the content-owner identification are included in a certificate revocation list (CRL),
    compare a content-certificate time stamp stored in a content certificate recorded on the disc and a CRL time stamp stored in the CRL in correspondence with the content-owner certificate and that identifies an invalidation date-and-time information of content-owner certificate included in the CRL, when the content-owner certificate and the content-owner identification are included in the CRL; and
  a content-use control section configured to prohibit or restrict use of the content when the content-certificate time stamp has date-and-time data later than the CRL time stamp.

2. The information processing apparatus according to claim 1, wherein the content-certificate time stamp is date-and-time information corresponding to a signature generation date and time by an issuer of the content certificate, and
  the CRL time stamp is an expiration date and time of a content-owner certificate corresponding to each content owner, a content-owner certificate becoming invalid after the CRL time stamp.

3. The information processing apparatus according to claim 1, wherein the data verification section reads the content-owner certificate from the disc to perform first signature verification, reads content-certificate-enabled data having a signature for data including the content certificate to perform second signature verification, and
  the content-use control section prohibits or restricts use of the content when the verification of the first signature fails and verification of the second signature fails.

4. The information processing apparatus according to claim 1, wherein the content-use control section inhibits or restricts playback, copy, external outputting of the content, or network-connection of the apparatus.

5. The information processing apparatus according to claim 1, wherein the disc is a recordable disc, and the content recorded on the disc is obtained and recorded by a user through download or through a shared terminal.

6. A content use controlling system, comprising:
  a disc including
    a content,
    a content certificate including certification data corresponding to the content and a time stamp corresponding to a date and time of signature by an issuer of the content certificate, and
    a content-owner certificate corresponding to a content owner that provided the content to the disc, the content-owner certificate including a content-owner identification; and
  a player configured to
  determine whether the content-owner certificate and the content-owner identification is included in a certificate revocation list (CRL),
  compare the content-certificate time stamp to a CRL time stamp stored in the CRL in correspondence with the content-owner certificate, when the content-owner certificate and the content-owner identification are included in the CRL,
  use the content when the content-certificate time stamp predates the CRL time stamp, and
  prohibit or restrict use of the content when the content-certificate time stamp post-dates the CRL time stamp.

7. The content use controlling system according to claim 6, wherein the content-owner certificate includes a tamper verification signature, and the disc includes content-certificate-enabled data having a signature for data including the content certificate, and the player verifies the signature included in the content-owner certificate and the content-certificate-enabled data, and when the signature verification fails, the player prohibits or restricts the use processing of the content.

8. A method of processing information for controlling use of a content recorded on a disc in an information processing apparatus, comprising:
   verifying whether content-owner identification recorded in a content-owner certificate corresponds to an owner of the content recorded on the disc;
   verifying whether the content-owner certificate and the content-owner identification are included in a certificate revocation list (CRL);
   comparing a content-certificate time stamp stored in a content certificate recorded on the disc and a CRL time stamp stored in the CRL in correspondence with the content-owner certificate and that identifies an invalidation date-and-time information of content-owner certificates including in the CRL, when the content-owner certificate and the content-owner identification are included in the CRL; and
   prohibiting or restricting use of the content when the content-certificate time stamp has date-and-time data later than the CRL time stamp.

9. The method of processing information according to claim 8, wherein the content-certificate time stamp is date-and-time information corresponding to a signature generation date and time by an issuer of the content certificate, and
   the CRL time stamp is an expiration date and time of a content-owner certificate corresponding to each content owner, a content-owner certificate becoming invalid after the CRL time stamp.

10. The method of processing information according to claim 8, further comprising:
    reading the content-owner certificate from the disc to perform first signature verification;
    reading content-certificate-enabled data having a signature for data including the content certificate to perform second signature verification; and
    prohibiting or restricting use of the content when the verification the first signature verification and the second signature verification fail.

11. The method of processing information according to claim 8,
    wherein inhibiting or restricting includes inhibiting or restricting playback, copy, external outputting of the content, or network-connection of an apparatus using the content.

12. A non-transitory computer-readable medium storing computer-readable instructions thereon for controlling use of a content recorded on a disc, the computer-readable instructions when executed by a computer cause the computer to perform a method comprising:
    verifying whether content-owner identification recorded in a content-owner certificate corresponds to an owner of the content recorded on the disc;
    verifying whether the content-owner certificate and the content-owner identification are included in a certificate revocation list (CRL);
    comparing a content-certificate time stamp stored in a content certificate recorded on the disc and a CRL time stamp stored in the CRL in correspondence with the content-owner certificate and that identifies an invalidation date-and-time information of content-owner certificates including in the CRL, when the content-owner certificate and the content-owner identification are included in the CRL; and
    prohibiting or restricting use of the content when the content-certificate time stamp has date-and-time data later than the CRL time stamp.

* * * * *